US006080225A

United States Patent [19]

Förster

[11] Patent Number: 6,080,225

[45] Date of Patent: Jun. 27, 2000

[54] PROCESS AND DEVICE FOR SEPARATING LIQUID DROPS FROM A GAS STREAM

[76] Inventor: Malte E. C. Förster, An der Jegengrenze 3, 40589 Dusseldorf, Germany

[21] Appl. No.: 08/793,906

[22] PCT Filed: Jun. 19, 1996

[86] PCT No.: PCT/EP96/02651

§ 371 Date: Apr. 18, 1997

§ 102(e) Date: Apr. 18, 1997

[87] PCT Pub. No.: WO97/00116

PCT Pub. Date: Jan. 3, 1997

[30] Foreign Application Priority Data

Jun. 19, 1995 [DE] Germany .......................... 195 22 102
Jun. 19, 1995 [DE] Germany .......................... 195 22 103
Jun. 19, 1995 [DE] Germany .......................... 195 22 104

[51] Int. Cl.[7] ............................ B03C 3/00; B01D 45/06

[52] U.S. Cl. .................................. 95/57; 55/440; 95/78; 95/267; 96/17; 96/66; 96/98

[58] Field of Search ................................. 95/57, 60, 61, 95/62, 78, 267; 96/17, 98, 99, 100, 66; 55/440, 462, 465

[56] References Cited

U.S. PATENT DOCUMENTS

| | | | |
|---|---|---|---|
| 970,053 | 9/1910 | Howard | 95/267 |
| 1,405,613 | 2/1922 | Milliken | 95/267 |
| 1,926,924 | 9/1933 | Sylvan | 55/440 |
| 2,724,457 | 11/1955 | Besser | 96/17 |
| 3,240,001 | 3/1966 | Kuhn et al. | 55/440 |
| 3,517,486 | 6/1970 | Golden | 55/440 |
| 3,813,855 | 6/1974 | Hill et al. | 55/440 |
| 4,178,156 | 12/1979 | Tashiro et al. | 95/61 |
| 4,784,674 | 11/1988 | Sarmineto et al. | 55/440 |
| 4,975,101 | 12/1990 | Swanborn | 55/440 |
| 5,302,190 | 4/1994 | Williams | 95/78 |
| 5,348,571 | 9/1994 | Weber | 95/78 |

FOREIGN PATENT DOCUMENTS

| | | | |
|---|---|---|---|
| 547981 | 2/1931 | Germany | 55/440 |
| 1007296 | 12/1955 | Germany . | |
| 1137980 | 10/1962 | Germany . | |
| 1521696 | 2/1970 | Germany . | |
| 1619832 | 11/1978 | Germany | 55/440 |
| 2854931 | 7/1980 | Germany | 55/440 |
| 7815425 | 7/1982 | Germany . | |
| 3151125 | 6/1983 | Germany . | |
| 8701718 | 5/1987 | Germany . | |
| 4214094 | 9/1993 | Germany . | |
| 240212 | 4/1946 | Switzerland | 55/440 |
| 546594 | 3/1974 | Switzerland | 55/440 |
| 1072877 | 2/1984 | U.S.S.R. | 55/440 |
| 1605130 | 11/1990 | U.S.S.R. | 55/440 |
| 820415 | 9/1969 | United Kingdom . | |

OTHER PUBLICATIONS

G. Mayer–Schwinning et al; Neuere . . . Nebeltröpfchen; 1980; pp. 375–383.

H. Salmang et al; Keramik; 1983; pp. 181, 205.

umwelt & technik; Apr. 1989; p. 44.

*Primary Examiner*—Duane S. Smith
*Attorney, Agent, or Firm*—Robert W. Becker & Associates

[57] ABSTRACT

A method of separating liquid drops from a gas stream includes the step of introducing the gas stream having a temperature greater than 600° C. into shaped elements having very narrow channels through which the gas stream flows, wherein the shaped elements are of a material that becomes conductive at high temperatures and further includes the step of selecting the width of the narrow channels based on the gas stream velocity such that turbulence is generated along the flow path causing the liquid drops to strike the channel walls and deposit thereon. The apparatus for separating liquid drops from a gas stream includes a plurality of shaped elements having very narrow channels through which the gas stream having a temperature greater than 600° C. flows, the shaped elements combined to a compound structure and are of a material that becomes conductive at high temperatures and the channels having a width based upon the gas stream velocity to effect turbulence along the flow path causing the liquid drops to strike the channel walls and deposit thereon.

16 Claims, 1 Drawing Sheet

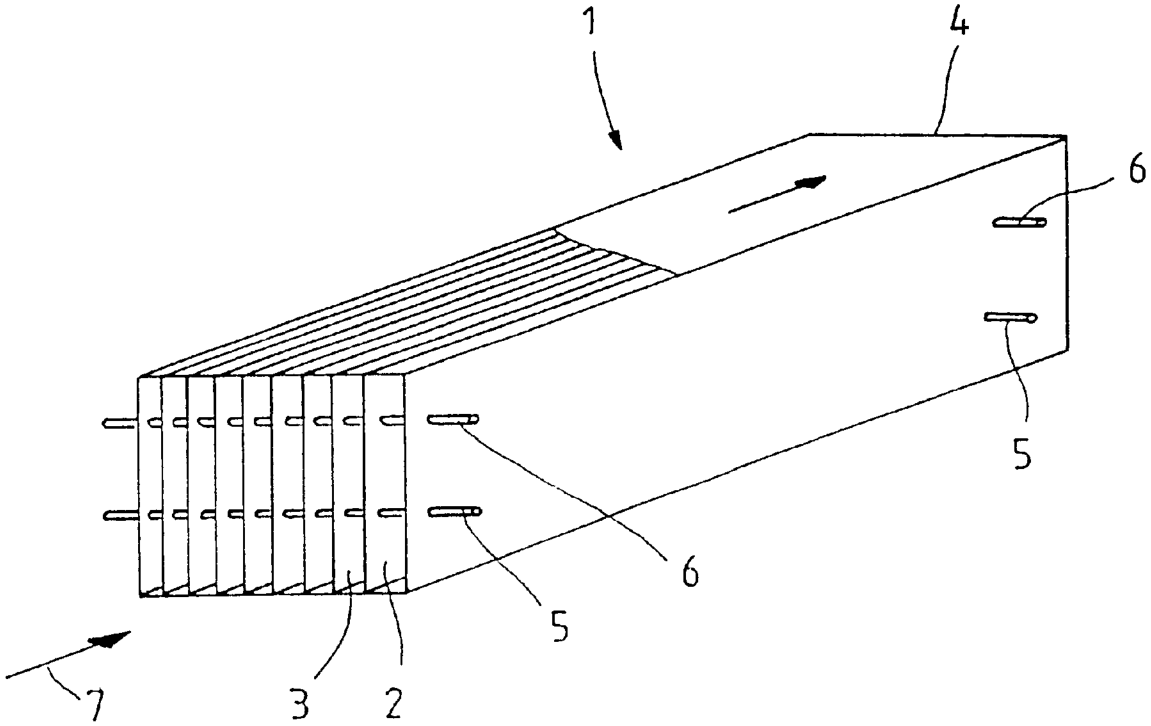
1
4
6
5
6
5
7
3
2

PROCESS AND DEVICE FOR SEPARATING LIQUID DROPS FROM A GAS STREAM

BACKGROUND OF THE INVENTION

The present invention relates to a process for removing droplets of liquid that are dispersed in a gas. In addition, the present invention relates to an apparatus for carrying out this process.

In particular, the present invention relates to the removal of droplets of liquid having diameters that are smaller than 10 μm. It is a known fact that the removal of droplets of liquid from a gas phase presents considerable difficulties as their diameters become smaller, and in particular when they reach diameters that are less than 10 μm. However, the removal of small droplets of this kind is both desirable and necessary in various branches of industry.

DE 42 14 094 C1 describes a droplets remover that is used to remove droplets from a flow of gas that is charged with liquid. This is an undulating profile with a flow line that is similar to a sinus wave. This known apparatus is suitable for drops of larger diameter and is based on the principle of direct flow against a wall as a consequence of the inertia of the drops. A droplet remover that operates on the same principle is known from DE 78 15 425 U1. This document proposes that in order to reduce the size of the drops that are to be removed, the sinusoidal passages be fitted with transverse stiffening plates and have corrugated plates at the edges so that the plates can be manufactured to be as thin as possible and thus easy to shape.

All sorts and types of dust separators, for example filtering separators, electrode separators, cyclone-type separators and the like are suitable for removing droplets. However, laminar and centrifugal separators are preferred, especially for removing droplets. When this is done, as in the droplet removal systems described above, the flow of gas is forced to change direction although the droplets do not conform to this change because of their inertia, and thus are deposited on the wall of the channel. However, if the droplets are smaller than 10 μm, such a system cannot be used effectively, since the droplets are almost unaffected by inertia as they follow this flow of gas.

Areas of use in which small droplets of this kind have to be removed from the gas phase are found, for example, in the domain of power-station technology, for example, in gas turbines, which operate at extremely high working temperatures, and the like. Even the smallest droplet can cause considerable damage or reductions of service life in the apparatuses that are used, as a function of the gas velocity.

Proceeding from this prior art, it is the task of the present invention to describe a process for removing droplets of liquid from a flow of gas, which can remove droplets of a size smaller than 10 μm, regardless of the temperature range, using simple means. In addition, an apparatus for carrying out this process is described.

SUMMARY OF THE INVENTION

The method for separating liquid drops from a gas stream is characterized by introducing into the gas stream shaped elements having very narrow channels through which the gas stream flows.

The method further includes the step of selecting a width of the channels such that, as a function of the gas velocity, a probability of gas/surface contact is maximized.

The width of the channels is variable.

In a flow direction of the gas stream the width of the channels changes.

The channels are formed in a stack of plates.

The channels are formed between surfaces of bodies.

The method may further include the step of designing the surfaces of the channels according to adhesion-relevant factors.

The surfaces are preferably porous.

The shaped elements have advantageously a compact design.

The shaped elements have a foam structure or a fibrous structure.

The apparatus for separating liquid drops from a gas stream is characterized by a plurality of shaped elements having very narrow channels through which the gas stream flows. The shaped elements are combined to a compound structure.

The shaped elements are stackable plates.

The shaped elements are bodies.

The shaped elements have surfaces designed according to adhesion-relevant factors.

The shaped bodies have a compact structure.

The shaped elements are arranged such that a spacing between neighboring ones of the shaped elements is changeable.

From the standpoint of the process, the technical solution to this problem proposes a process to remove droplets of liquid from a flow of gas that is characterized in that shaped elements that form narrow passages through which the gas can flow are installed on the path followed by the flow of gas.

The solution according to the present invention uses the effect that gas flowing in a pipe moves at flow velocities that are a function of the distance from the wall. The molecules of gas in the immediate vicinity of the wall will be retarded to a velocity of almost 0 whereas higher velocities will occur as the distance from the wall increases. If the channels are made narrow enough, there will be considerable turbulence along the flow path. Since the droplets of liquid that are discussed herein follow the flow of gas with almost no inertia, they will strike a wall statistically and be deposited there.

It is advantageous that the width of the channels be so narrow that, taking the velocity of the gas into consideration, the probability of gas/surface contact is maximized. As a special advantage it is proposed that the width of the channels be made variable and adjustable. According to a further advantageous proposal embodied in the present invention the width of the channels can vary along the flow path.

In the sense of the present invention, droplets are the preferred area of application. The present invention is suitable for each kind of particle, even if these are in other aggregate or intermediate states as a function of the temperature.

A preferred proposal made by the present invention is such that the channels are formed in a stack of plates. This can be done in a simple matter. As an alternative or in addition to this, bodies can be combined to form the channels. A laminar sub-stratum that occurs in the vicinity of the wall can be taken into account by appropriate configuration of the surface. The adhesion of the droplets to the wall is affected by molecular interaction, which is referred to as wetting. Thus, by suitable selection of the material for the surface of the bodies or the plates around which the flow passes, it is possible to exert considerable influence on this adhesion. In addition, coalescence to form a film of liquid facilitates removal by reducing surface tension.

The surface configuration can be selected taking factors relevant to adhesion into account. Within the context of the present invention, these factors are the question of the wettablility or non-wettability of a surface, on the one hand, and management of the liquid that collects on these surfaces, on the other. As an example, a surface can be so configured that the droplets run together and form large-area, easily managed units that can no longer be stripped off the surface, or the surface can be such that the droplets that land on it remain separated, as far as possible, and can thus be picked up again by the flow. The surfaces can be smooth, rough, porous or of any other configuration. The surface itself can be of a compact, foam, fibrous, or similar structure.

From the standpoint of the apparatus itself, in order to use the effect described above, it is proposed that—in the simplest case—the gas flows through the particularly narrow channels of a stack parallel to the plates that are arranged next to each other, so that the probability of gas/surface contact is maximized. In addition to the selection of the material for the wall, the dimensions that are decisive for removal are the width of the channel that can be set up, and the velocity of the flow of gas. The two last-named factors are dependent on the material constants of the gas and the actual operating parameters such as pressure and temperature. Thus, it is possible to optimize removal by taking these parameters into account.

As an alternative, it is proposed that geometrical variations, for example, triangular or round bodies or combinations of these, can be used in place of plates. The channels must not of necessity be rectilinear, rather, the path of the flow can be curved. It is also possible to use separator profiles to the extent that the geometry permits the required narrow width of the channels. The direction of the flow can also be matched to requirements, for example, direct flow or with the gases flowing in the opposite direction to the liquid that is removed, and by the position of the separator relative to the horizontal or the vertical plane.

Generally speaking, ceramic materials are classified as electrical insulators, their conductivity depending both on their composition and on the temperature. However, one cannot find good insulating properties in all ceramics in each temperature range. Thus, for example, ceramics that contain zirconium oxide have been found to be materials that display markedly differing changes in conductivity at temperatures above 600° C. compared to good insulators; as the temperature increases, these materials rapidly move into a range of conductors with resistances in the kilo-ohm range. This effect is particularly marked in the case of fusion-cast ceramics and is obviously based on easier electron motility that is brought about by the particular structure of the material. The use of oxides from the series of secondary-group elements, for example zirconium oxide and the like, is thus preferred.

In addition to the materials referred to above, it is also possible to use other ceramics or ceramic-like materials, for example, non-oxide ceramics such as carbides, suicides, nitrides, or the like. In addition, it is within the scope of the present invention to amplify the effect of the charge-generating surface that is based on high temperature by the application of additional current.

The effect referred to as thermo-emission is used to build up a field between at least two surfaces of the type described above.

Particles contained in a flow of gas can be deflected, collected, neutralized, or otherwise influenced using the process according to the present invention. According to this process, the surfaces can be formed on one wall of a section of the flow, on an additional element, or on a structural element that is to be arranged in the area of the flow.

The process according to the present invention makes use of particular material properties under appropriate temperature and flow conditions in order to deflect droplets of the smallest diameters that are contained in a flow of gas, to collect these, or otherwise influence them, the measures according to the present invention being economical and simple to realize.

BRIEF DESCRIPTION OF THE DRAWINGS

Additional advantages and features of the present invention are set out in the following description, which is based on the drawing appended hereto. The drawing shows the following:

FIG. 1: a perspective diagrammatic view of one embodiment of a separator.

DESCRIPTION OF PREFERRED EMBODIMENTS

FIG. 1 is a diagrammatic view of a plate packet that comprises a plurality of parallel plates, with unobstructed channels left between them. The intervening spaces are adjustable, to which end adjusting bolts and washers can be used. These attachment areas can lie outside the areas through which the gas flows or, in contrast to this, they can be covered so as to facilitate the flow of gas.

The plates 2, 3 can be manufactured from materials that generate different charges when hot gas flows between them, so that an electrical field can be built up. This can greatly facilitate the removal of droplets of liquid, as described above. The separator 1 incorporates the plates 2, 3 that are arranged within a housing 4 by means of adjusting bolts 5, 6 in such a way that they can be adjusted to form suitably narrow channels. In the embodiment that is shown, the direction of the flow is indicated by the arrow 7.

The plates can be suspended in cross sections of the flow, inserted into grooves, or otherwise secured. The plates can be used as conducting-insulating plates as emitters or can be used with reversed polarity.

The present invention is, of course, in no way restricted to the specific disclosure of the specification and drawings, but also encompasses any modifications within the scope of the appended claims.

I claim:

1. A method for separating liquid drops from a gas stream, said method comprising the step of introducing into a gas stream having a temperature greater than 600° C., shaped elements having very narrow channels through which the gas stream flows, wherein said shaped elements are comprised of a material that becomes conductive at high temperatures, and further comprising the step of selecting a width of said very narrow channels based on the velocity of the gas stream such that turbulence is generated along the flow path causing the liquid drops to strike the channel walls and deposit thereon.

2. A method according to claim 1, wherein in the step of selecting a width of said channels includes maximizing a probability of gas/surface contact.

3. A method according to claim 2, wherein the width of said channels is variable.

4. A method according to claim 2, wherein in a flow direction of the gas stream the width of said channels changes.

5. A method according to claim 1, wherein said channels are formed in a stack of plates.

6. A method according to claim 1, wherein said channels are formed between surfaces of bodies.

7. A method according to claim 1, wherein the surfaces are porous.

8. A method according to claim 1, wherein said shaped elements have a foam structure or a fibrous structure.

9. An apparatus for separating liquid drops from a gas stream, said apparatus comprising a plurality of shaped elements having very narrow channels through which a gas stream having a temperature greater than 600° C. flows, said shaped elements combined to a compound structure, wherein said shaped elements are comprised of a material that becomes conductive at high temperatures, and wherein a width of said very narrow channels is selected based on the velocity of the gas stream such that turbulence is generated along the flow path causing the liquid drops to strike the channel walls and deposit thereon.

10. An apparatus according to claim 9, wherein said shaped elements are stackable plates.

11. An apparatus according to claim 9, wherein said shaped elements are bodies.

12. An apparatus according to claim 9, wherein said shaped elements are arranged such that a spacing between neighboring ones of said shaped elements is changeable.

13. A method according to claim 1, wherein said shaped elements are made of a material selected from the group consisting of ceramic materials.

14. A method according to claim 13, wherein said method is used to remove droplets of liquid having diameters smaller than 10 μm.

15. An apparatus according to claim 9, wherein said shaped elements are made of a material selected from the group consisting of ceramic materials.

16. An apparatus according to claim 15, for use in removing droplets of liquid having diameters smaller than 10 μm.

* * * * *